US012631884B1

(12) United States Patent
Sears et al.

(10) Patent No.: US 12,631,884 B1
(45) Date of Patent: May 19, 2026

(54) MINIMIZING ANTENNA INTERFERENCE IN SMART GLASSES

(71) Applicant: Meta Platforms Technologies, LLC, Menlo Park, CA (US)

(72) Inventors: Jasmine Soria Sears, Kirkland, WA (US); Yu Shi, Redmond, WA (US); Lijun Zhang, Los Gatos, CA (US); Liang Han, Sunnyvale, CA (US); Javier Rodriguez De Luis, Kirkland, WA (US); Chia-Ching Lin, San Jose, CA (US); Afsoon Jamali, Issaquah, WA (US); Sho Nakahara, Bothell, WA (US); Frank Leard, Sudbury, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 742 days.

(21) Appl. No.: 18/086,560

(22) Filed: Dec. 21, 2022

(51) Int. Cl.
| | |
|---|---|
| *G02B 27/00* | (2006.01) |
| *G02B 27/01* | (2006.01) |
| *G02C 7/10* | (2006.01) |
| *G02C 11/00* | (2006.01) |

(52) U.S. Cl.
CPC ..... *G02B 27/0176* (2013.01); *G02B 27/0172* (2013.01); *G02C 7/101* (2013.01); *G02C 7/102* (2013.01); *G02C 11/10* (2013.01)

(58) Field of Classification Search
CPC G02B 27/0176; G02B 27/0172; G02C 7/101; G02C 7/102; G02C 11/10; G02C 7/10; G02C 7/105; G02C 7/108; G02C 11/12
USPC ............................................... 351/44
See application file for complete search history.

(56) References Cited

U.S. PATENT DOCUMENTS

2018/0003966 A1* 1/2018 Kilcher ..................... G02F 1/15

* cited by examiner

*Primary Examiner* — Henry Duong

(74) *Attorney, Agent, or Firm* — Morgan, Lewis & Bockius LLP

(57) ABSTRACT

The disclosure provides an optical system to reduce antenna interference for smart glasses. The optical system includes a lens device and a frame. The frame is configured to engage the wearer's head and house additional technology such as a power system and projector to support augmented and virtual reality technology. The lens device comprises a plurality of layers that are adhered together. The lens device includes a first lens layer. The lens device includes an eye-tracking layer adjacent to the first lens layer. The lens device includes a waveguide layer oriented adjacent to the eye-tracking layer; an active dimming layer oriented adjacent to the waveguide layer, and a second lens layer oriented adjacent to the active dimming layer. The frame is configured to house the lens device. The frame also comprises an antenna, wherein the antenna is spatially oriented away from the waveguide and active dimming layer by at least a separation distance.

20 Claims, 9 Drawing Sheets

MINIMIZING ANTENNA INTERFERENCE IN SMART GLASSES

TECHNICAL FIELD

The disclosure relates to a device for augmented reality/virtual reality glasses, in particular reality/virtual reality glasses that reduce internal interference.

BACKGROUND

Smart glasses for use in augmented reality/virtual reality (AR/VR) applications typically include optical elements and structures such as gratings, nanostructures, beam-splitters, and an antenna embedded in the eye frame structure. In some cases, the antenna can cause interference with optical elements. Adjustments to the power supplied to the antenna provide certain operational limitations. In particular, solutions that involve adjusting power inputs to the antenna are prohibited due to potentially increasing antenna signal transmission in direct proximity to the wearer's head.

SUMMARY

In one aspect, the disclosure provides an optical system to reduce antenna interference for smart glasses. The optical system includes a lens device and a frame. The frame is configured to engage the wearer's head and house additional technology such as a power system and projector to support augmented and virtual reality technology. The lens device comprises a plurality of layers that are adhered together. The lens device includes a first lens layer. The lens device includes an eye-tracking layer adjacent to the first lens layer. The lens device includes a waveguide layer oriented adjacent to the eye-tracking layer; an active dimming layer oriented adjacent to the waveguide layer; and a second lens layer oriented adjacent to the active dimming layer. The frame is configured to house the lens device. The frame also comprises an antenna, wherein the antenna is spatially oriented away from the waveguide and active dimming layer by at least a separation distance.

In another embodiment, the disclosure provides an optical system to reduce antenna interference for smart glasses. The optical system includes a lens device and a frame. The frame is configured to engage the wearer's head and house additional technology such as a power system and projector to support augmented and virtual reality technology. The lens device comprises a plurality of layers that are adhered together. The lens device includes a first lens layer. The lens device includes an eye-tracking layer adjacent to the first lens layer. The lens device includes a waveguide layer oriented adjacent to the eye-tracking layer; an active dimming layer oriented adjacent to the waveguide layer, and a second lens layer oriented adjacent to the active dimming layer. The surface resistance defined by the active dimming layer is variable across a surface of the active dimming layer. The frame is configured to house the lens device. The frame also comprises an antenna, wherein the antenna is spatially oriented away from the waveguide and active dimming layer by at least a separation distance.

The invention generally relates to smart glass technology used in an AR environment, which may be manufactured with appropriate materials and processes, and which may be scaled as needed. Other objects, features, and advantages of the invention will become apparent from the following detailed description taken in conjunction with the accompanying drawings.

BRIEF DESCRIPTION OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
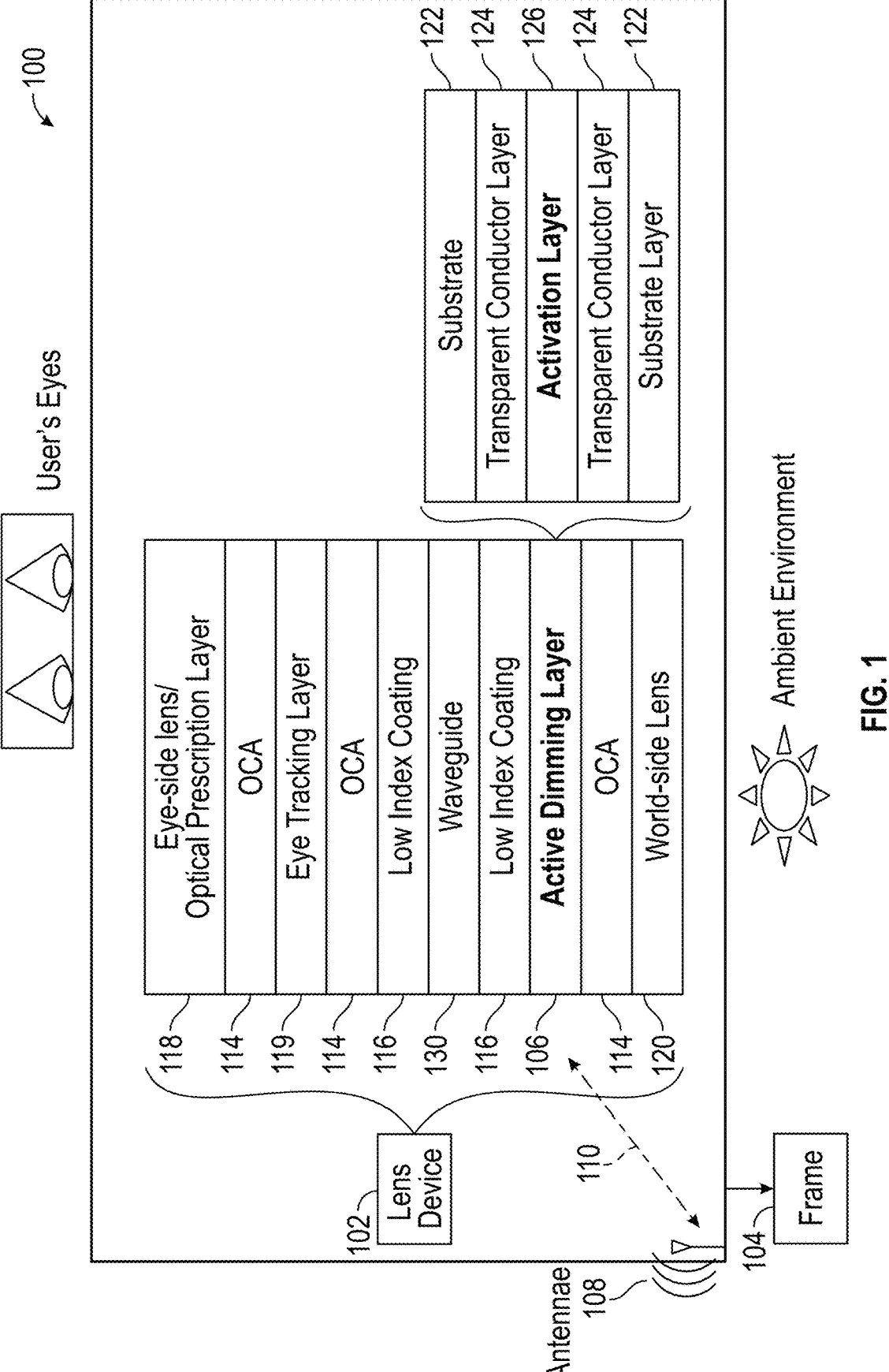
FIG. 1 depicts a block diagram of the optical system.

A user-functional optical system may include a display component that provides AR optical display to the eye. In some configurations, the optical operation of the user-functional optical system may exhibit interference caused by a constituent antenna in the system. Design of these structures in the optical system can be optimized for minimal interference between signal transmission of the antenna and other components (e.g., the display) of the optical (smart glass) system.

Reference is made herein to the attached drawings. Like reference numerals may be used in the drawings to indicate like or similar elements of the description. The figures are intended for representative purposes and should not be considered limiting. The present disclosure can be understood more readily by reference to the following detailed description of the present disclosure and the examples included therein.

Before the present articles, systems, devices, and/or methods are disclosed and described, it is to be understood that they are not limited to specific implementations unless otherwise specified, or to particular approaches unless otherwise specified, as such can, of course, vary. It is also to be understood that the terminology used herein is for the purpose of describing aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

DEFINITIONS

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this present disclosure belongs. In this specification and in the claims which follow, reference will be made to a number of terms which shall be defined herein.

As used in the specification and the appended claims, the singular forms "a," "an," and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two units are also disclosed. For example, if 10 and 15 are disclosed, then 11, 12, 13, and 14 are also disclosed.

As used herein, the terms "about" and "at or about" mean that the amount or value in question can be the value designated to some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, and the number or type of aspects described in the specification.

Disclosed are the components to be used to manufacture the disclosed devices, systems, and articles of the present disclosure as well as the devices themselves to be used within the methods disclosed herein. These and other materials are disclosed herein, and it is understood that when combinations, subsets, interactions, groups, etc. of these materials are disclosed, that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the present disclosure. Thus, if there are a variety of additional steps that can be performed, it is understood that each of these additional steps can be performed with any specific aspect or combination of aspects of the methods of the present disclosure.

Figure 2:
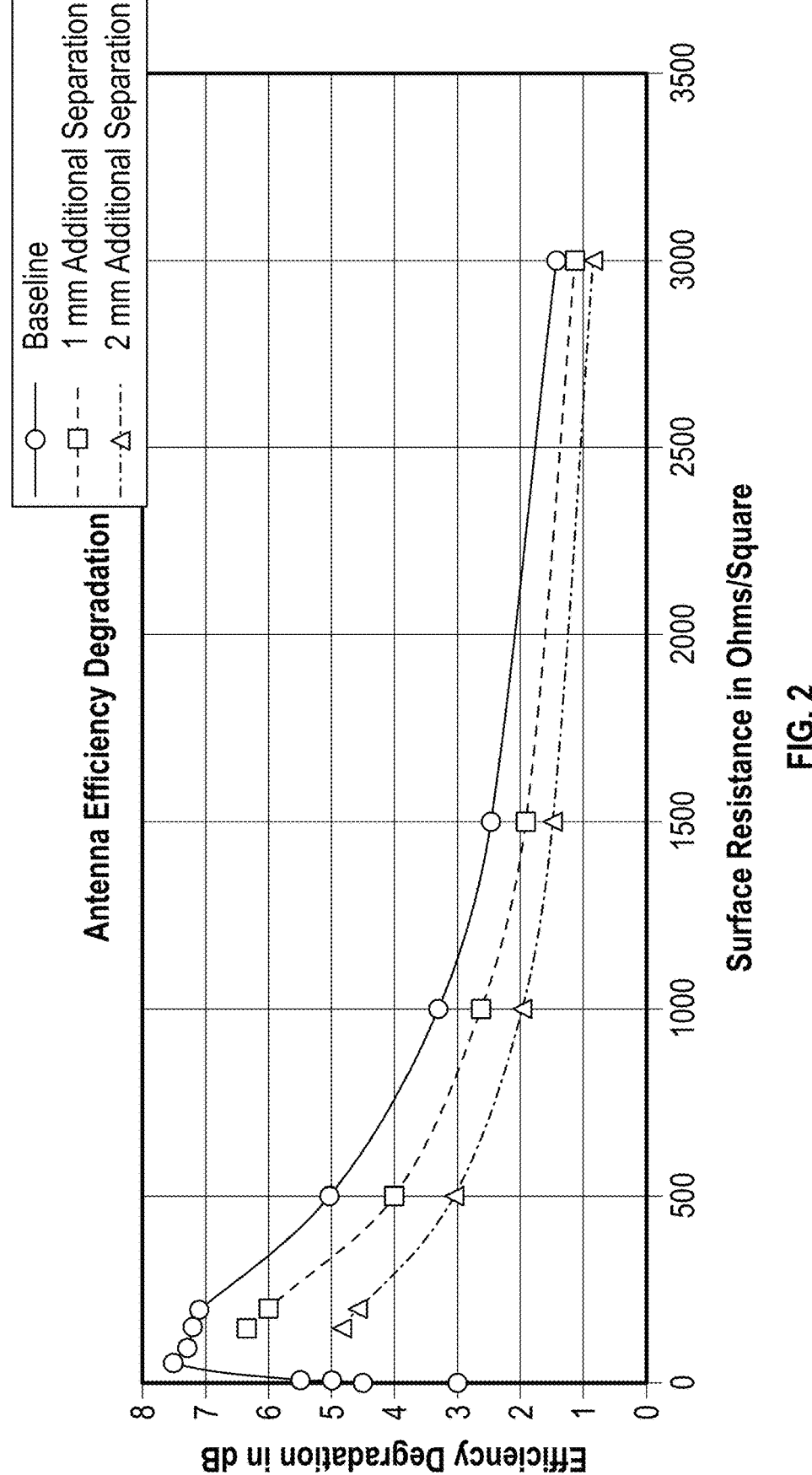
FIG. 2 depicts a graph of empirical data displaying the relationship between surface resistance, separation distance, and efficiency degradation.

The system 100 can comprise a lens device 102 and frame 104. The lens device 102 can comprise a plurality of layers. The plurality of layers are configured to provide additional functionality to the lens device 102. For example, the lens device 102 can comprise an active dimming layer 106 that allows the device to obstruct light. The electrical field generated by the lens device 102 can degrade signal transmission at the antenna 108. The degraded signal sent or received from the antenna 108 can be impacted by the resistivity exhibited by the lens device 102 and the distance of the antenna 108 from the resistivity source. FIG. 2 depicts the relationship between factors including: the distance between the antenna and the source of resistance (separation), surface resistance (e.g., resistance across a surface layer of the lens device) and efficiency degradation (antenna signal transmission) in decibels (dB). In the relationship between the factors, as separation is increased, the amount of surface resistivity necessary to reduce degradation is decreased. In other words, performance of the antenna is increased the farther the antenna is from the wave guide 130 and active dimming layer 106. Optimizing the separation 110 can define where on the frame 104 the antenna 108 needs to be placed. For example, the antenna 108 can be a fixture in the lens device 102 or placed on the frame 104. In one aspect, the separation distance can be at least 1.2 mm to reduce the efficiency degradation. The system 100 can be configured to maintain signal efficiency degradation below 3 dB. In a further aspect, the antenna can be metallic, such as copper or silver. In other embodiments, antennas can comprise carbon composites or ceramic materials such as barium carbonate, silicon dioxide, or yttrium oxide. The antenna can also be configured to receive and transmit signals, wherein the frequency spectrum of the antenna 108 can range between 400 MHz and 11 GHz.

The lens device 102 can comprise a plurality of layers. Referring back to FIG. 1, the successive layers of the lens device 102 can be bonded by an optically clear adhesive (OCA) 114. In particular, the OCA 114 can be used to bond layers without providing significant impact to the light propagation through the lens device 102. In another aspect, the lens device can comprise a refractive index coating 116. The refractive index (RI) coating can be a solvent-based ultraviolet (UV) curable coating. In one aspect, the RI can be less than 1.15 for plastic substrates. The refractive index coating can also be an inorganic thermal curable coating for glass. It can be used in optical stacks to match the RI requirements in that specific construction. The index coating can be used to reduce the reflection of a plastic substrate.

The lens device 102 can also comprise two lens layers; a first lens layer can comprise an eye-side lens 118. The second lens layer can comprise a world-side lens 120. Light propagation through lens layers is defined by the optical power. The optical power is the degree to which a lens converges or diverges light. The typical SI unit for optical power is the inverse meter ($m^{-1}$), dioptre. The eye-side lens 118 can be oriented adjacent to the user's eye and world-side lens 120 can be adjacent to the real world/ambient environment. In a further aspect, the optical power value of the eye-side lens 118 can be a negative value. The optical power value of the world-side lens 120 can be a positive value. Further, the sum of the optical power value for eye-side and world-side lens can equate to zero. For example, the optical power of the eye-side lens 118 can be negative one (−1) dioptres ($m^{-1}$) and the world-side lens 120 can be positive one (+1) dioptres ($m^{-1}$), wherein the collective sum of both layers equates to zero (0). In yet a further aspect, when the user wears prescription glasses, the lens device 102 can include the appropriate adjustment. For example, the optical power value of the eye-side lens 118 can include an optical power associated with the wearer's prescription (e.g., $-1$ $m^{-1}+-2$ $m^{-1}=-3$ $m^{-1}$, where $-2$ $m^{-1}$ is the optical power associated with the user's optical prescription). When there is an optical prescription, the world side lens 120 optical power is equal to the absolute value of the eye-side lens 118 minus the absolute value of optical power associated with prescription. In other words, only the non-prescription part of the eye-side lens optical power should be canceled out by the world-side lens (e.g., $|-3$ $m^{-1}|-|-2$ $m^{-1}|=+1$ $m^{-1}$, which is the optical power of the world-side lens). The lens device 102 can also comprise an eye tracking layer 119 and the wave guide 130 can be components operating in conjunction with an image projector (not shown). The image projector can project images on the wave guide 130. The response by the user's pupils can be detected by the eye-tracking layer 119 comprising a transparent material.

The lens device 102 can comprise multiple embodiments to integrate the active dimming layer 106. In one aspect, the active dimming layer 106 can comprise a plurality of sublayers, the active dimming layer 106 can comprise a first substrate layer 122, a first transparent conductor layer 124, an activation layer 126, a second transparent conductor layer 124 and a second substrate layer 122. In one aspect, the active dimming layer 106 can range between 175 to 400 microns. In further embodiments, each layer and sublayer depicted on FIG. 1 can range between 50 microns to 1 mm.

Figure 3:
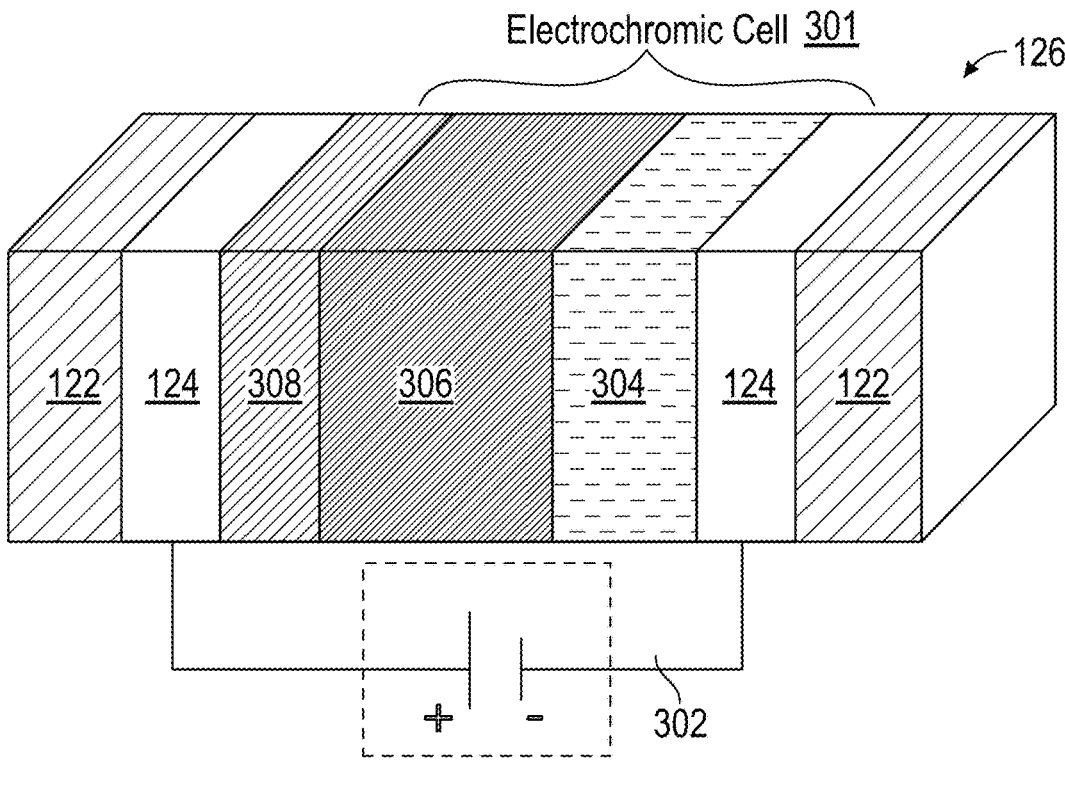
FIG. 3 depicts a perspective view of an active dimming layer comprising an electrochromic cell.
Figure 4:
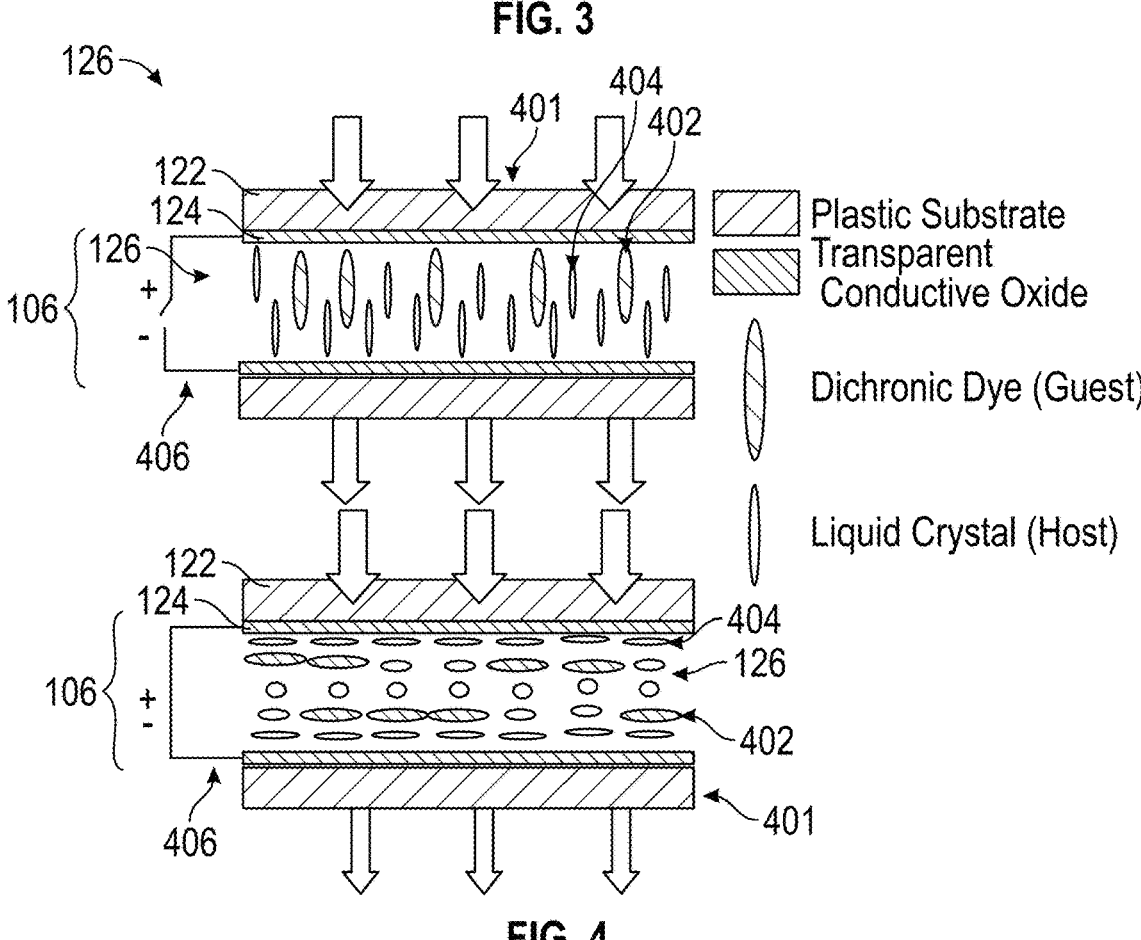
FIG. 4 depicts a perspective view of an active dimming layer comprising a guest-host liquid crystal (GHLC) cell.

As shown in FIGS. 3-4, the activation layer 126 of the active dimming layer 106 can comprise technology to dim, filter, or obstruct light propagation through the entirety of the lens device. Exemplary mechanisms for obstruction of light propagation can include embodiments such as, guest-host liquid crystal (GHLC) or electrochromic technology. In other embodiments, the activation layer 126 can comprise a mechanical mechanism such as a shutter.

In one aspect, as depicted in FIG. 3, the active dimming layer 106 can comprise an electrochromic cell 301, wherein the electrochromic cell functions by employing a mechanism to obstruct or dim light passing through the lens device 102. In one aspect, the electrochromic cell 301 can comprise a first outer substrate layer 122. The first and second outer substrate layers 122 can comprise a flexible plastic (e.g., polycarbonate or PET layer) to protect the inner layers and provide structural integrity. Adjacent to an interior surface of the substrate 122 can be a first conductor transparent layer 124. The transparent conductor layer 124 can function as one electrical conduit for electrochromic cell circuit 302 that supplies electricity to the activation layer 106. The transparent conductor layer 124 can comprise indium tin oxide (ITO) or silicon dioxide ($SiO_2$). Adjacent to an interior surface of transparent conductor layer 124, the electrochromic cell anode 304 can be positioned. Adjacent to the electrochromic cell anode 304, the electrolyte layer 306 can be positioned. The electrolyte layer 306 can comprise a plurality of chemicals including both organic based solutions, solid based inorganic solutions, conductive polymers, or combinations thereof. An electrochromic cell cathode 308 can be adjacent to the electrolyte layer 306. The cathode layer 308 can store ions that bond or de-bond with the electrolyte composition in the electrolyte layer when electrical power is sent through the two transparent conduction layers. Adjacent to the cathode layer 308 is the second transparent conductor layer 124.

In another embodiment, the active dimming layer 106 can comprise a GHLC cell 401, depicted in FIG. 4. The GHLC cell can comprise two plastic substrates 122, oriented adjacent to conductor layers 124. The conductor layers 124 can be coated with an electro-conductive film. The activation layer 126, oriented between the conductor layers 124, can include dye molecules 402 that are added to a liquid crystal solution 404, wherein the orientation of the dye molecules are changed under the flow of an electron field through the GHLC circuit 406. When the circuit is closed, the electrical flow can change the transmission perpendicular to the cell resulting in a dimming effect.

Figure 5:
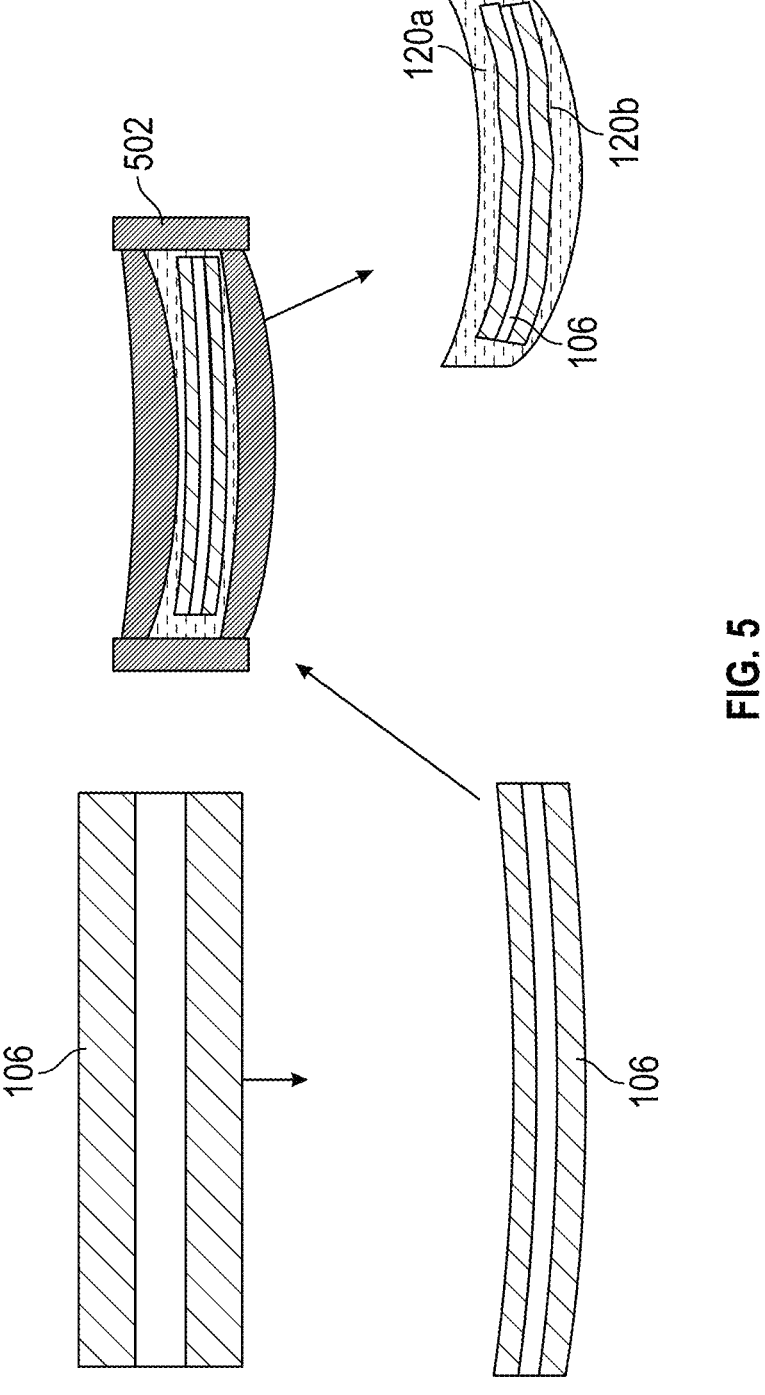
FIG. 5 depicts a block diagram of forming an active dimming layer with lens layers.
Figure 6:
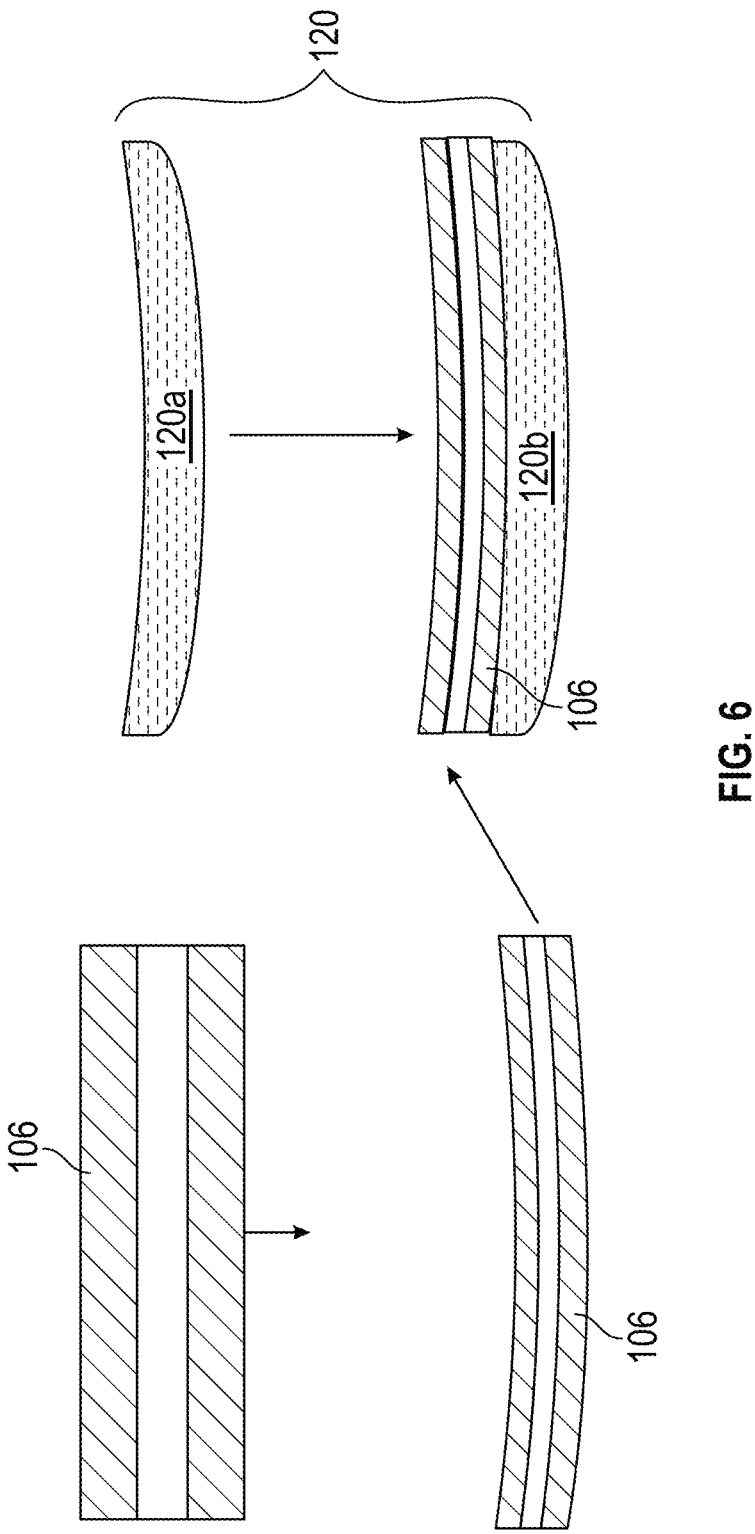
FIG. 6 depicts a block diagram of an alternative method of forming an active dimming layer with lens layers.

As shown in FIG. 5, the active dimming layer can be positioned between layers 120a, 120b of the world-side layer 120. In another aspect, as depicted in FIG. 5, the active dimming layer 106 can be curved by thermoforming. The active dimming layer 106 can be placed into a cast 502. In one aspect, the cast 502 can be injection molded by using a curable material comprising the world-side lens layer 120, wherein the liquified material can be cured by light or heat to solidify the form of the world-side lens layer 120. In another aspect, the world-side lens layer 120 can be 3D printed to encapsulate the active dimming layer 106. For example, the outermost sublayer of the world-side lens layer 120 can be a cap layer to protect the active dimming layer 106. In yet another aspect, the world-side lens layer can comprise an anti-reflective coating, wherein the anti-reflective coating can be placed on outermost region of world-side lens layer 120. In an alternate embodiment that is depicted in FIG. 6, the active dimming layer 106 can be thermoformed. The thermoformed active dimming layer 106 can be encapsulated between two sublayers 120a, 120b of the world-side lens 120. In another aspect, the world-side lens 120 can comprise photochromic properties. In a further aspect, the world-side lens 120 can comprise an anti-reflective coating.

Figure 7:
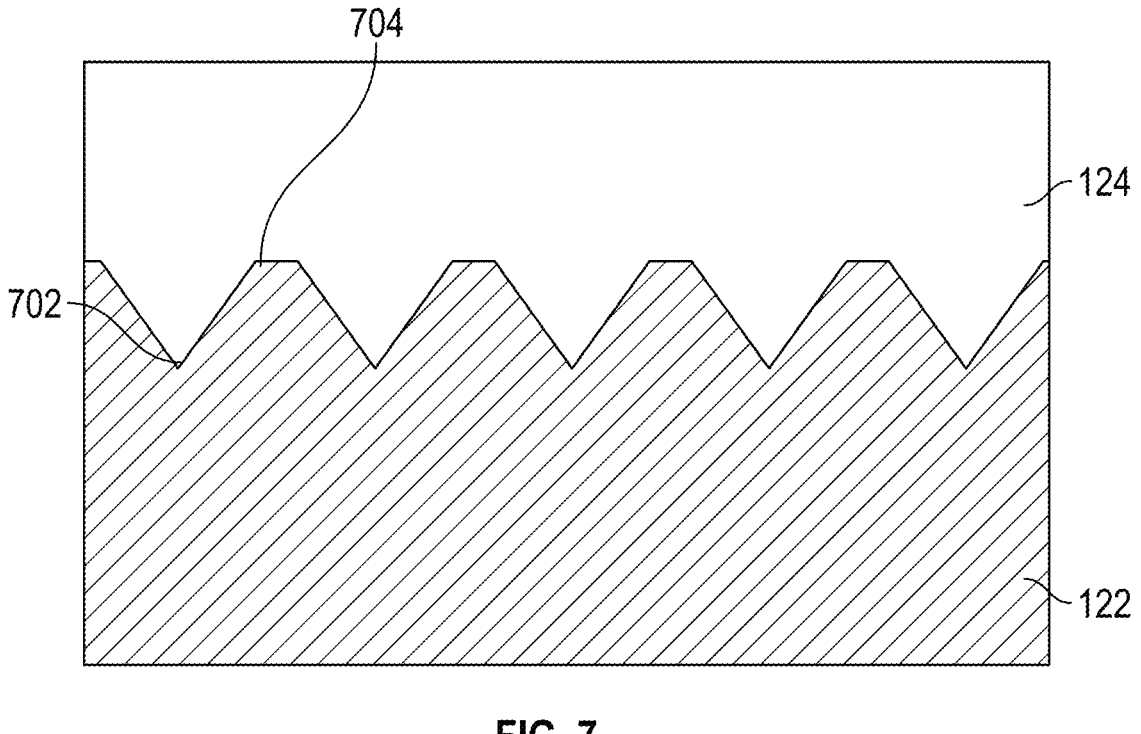
FIG. 7 depicts a cross-sectional view of an interface between two layers of the lens device.
Figure 8:
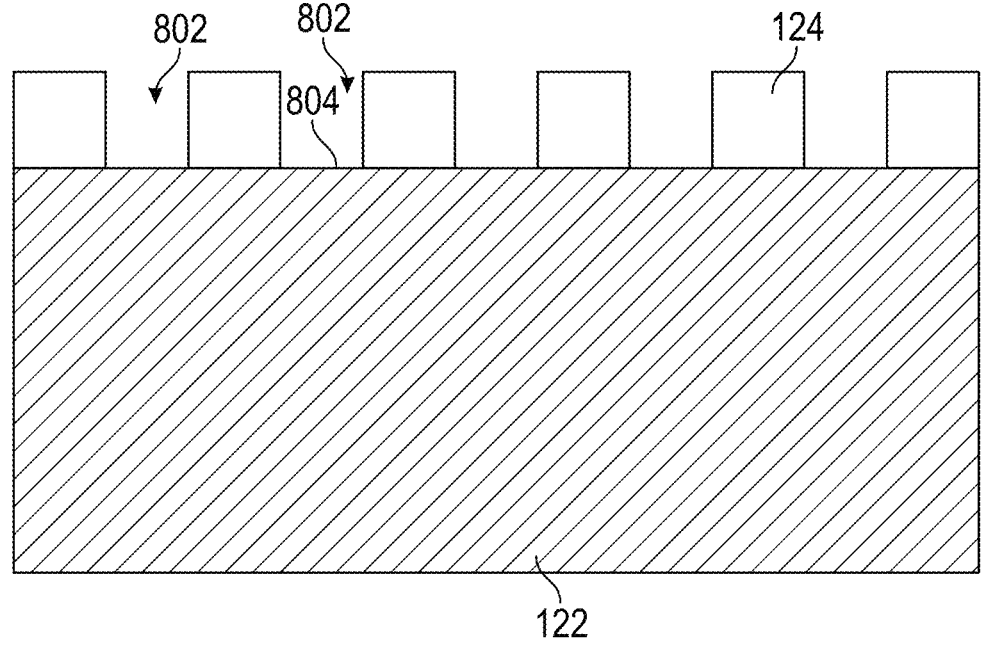
FIG. 8 depicts a cross-sectional view of an alternative interface between two layers of the lens device.
Figure 9:
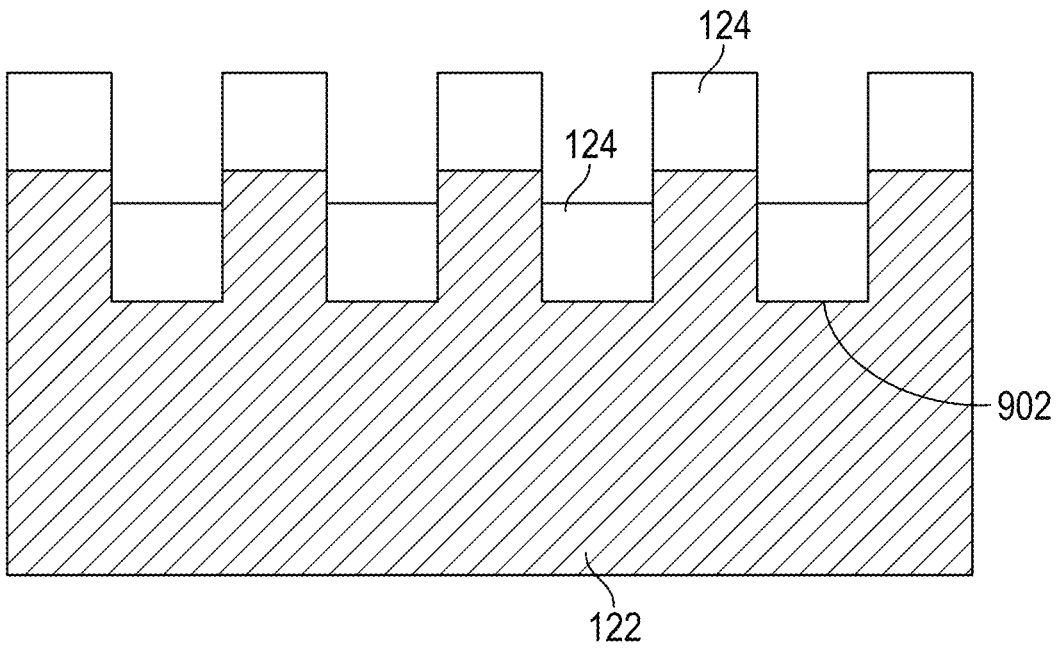
FIG. 9 depicts a cross-sectional view of a second interface between two layers of the lens device.

To further adjust the electrical resistance exhibited by the lens device 102, the physical interface between layers can comprise alternate configurations. In one aspect, the interface between the transparent conductor layers 124 and the exterior substrate 122 can comprise a patterned interface. For example, as depicted in FIG. 7, the cross section of the interface between the mating surfaces of the transparent conductor 124 and the exterior substrate 122 can comprise a mated engagement arrangement. The mated engagement arrangement can comprise ridges on both surfaces such that the ridge-peak 702 of one surface engages with the opposing ridge-valley 704 of the other surface. Further, this configuration increases the electrical resistance across the surface of the transparent conductor layer 124 and can decrease the optical losses such that light propagation is not impacted. In another embodiment, as depicted in FIG. 8, the transparent conductor layer 124 can be coupled to the substrate layer 122 and can comprise channels 802 along the cross section of the mating surfaces 804. In a further aspect, the channeled configuration of the transparent conductor layer 124 can be printed or lithographed on to the substrate layer 122. In another embodiment, as depicted in FIG. 9, the interface between the transparent conductor layer 124 and the plastic substrate 122 can comprise channels or pits 902. The transparent conductor 124 can be lithographed or 3D printed onto the plastic substrate 122. In this configuration, the conductor 124 is being deposited into the pits 902, which can reduce antenna interference due to the transparent conductor layer 124 not being uniformly connected to the rest of the sheet.

Figure 10:
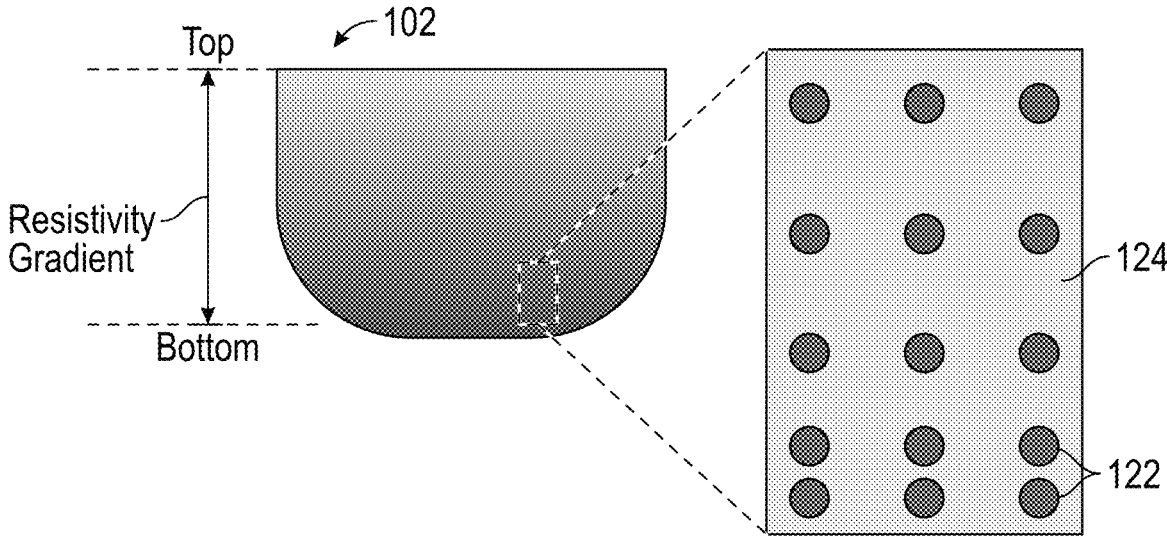
FIG. 10 depicts a zoomed view of a lens device with variable resistance along a length dimension of the lens.
Figure 11:
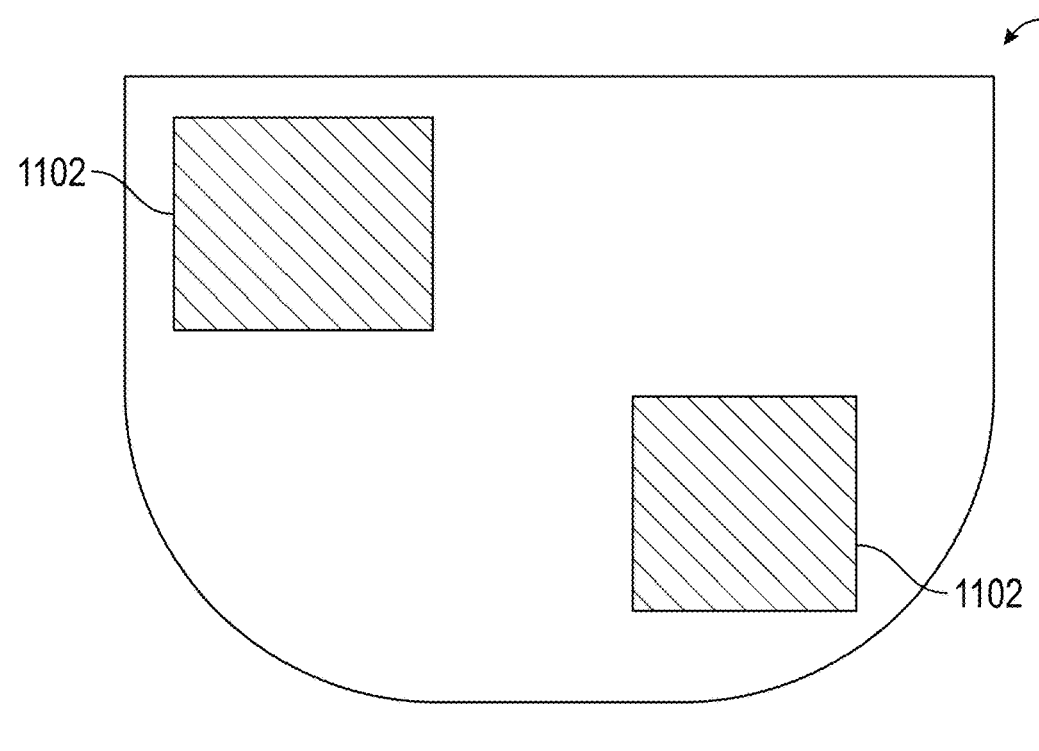
FIG. 11 depicts the lens device with a localized (discrete) active dimming configuration.
Figure 12:
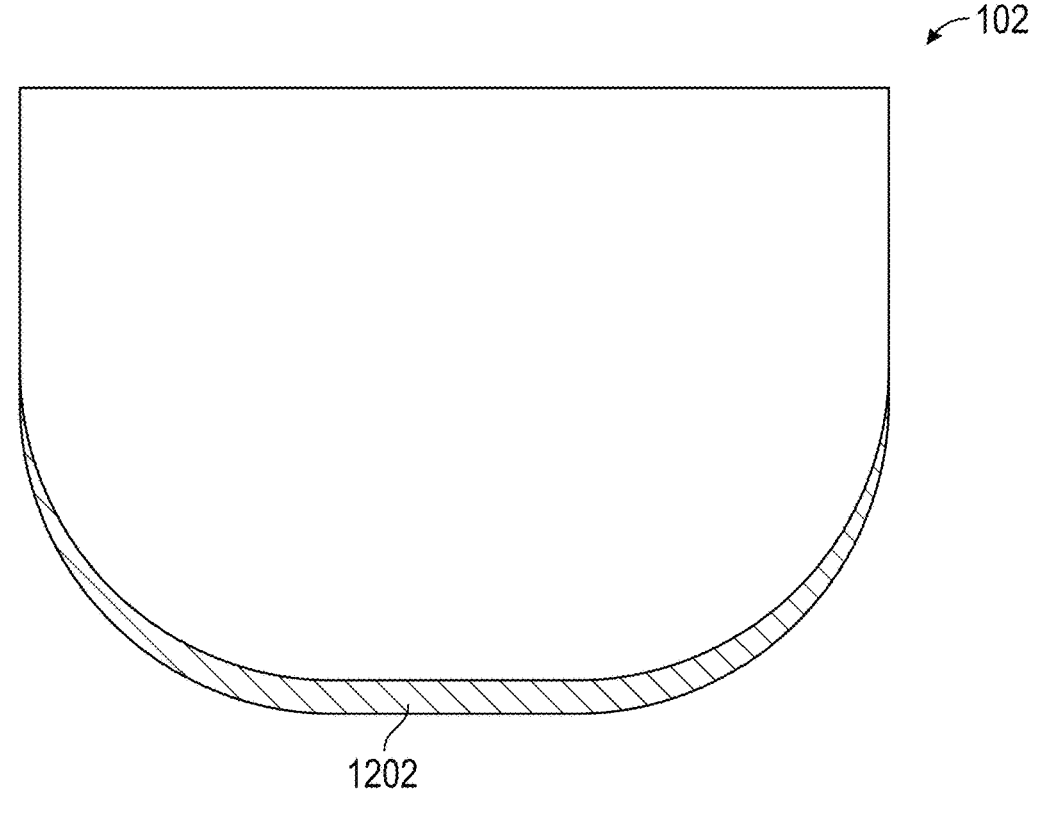
FIG. 12 depicts a lens device with a bus bar.

In a further aspect, the lens device 102 can be configured such that the resistivity changes along a length dimension of the lens device. For example, as depicted in FIG. 10, the resistance at the top of the lens can increase from the top of the lens device to the bottom. In another embodiment, the resistance gradient can be reversed such that the resistance decreases from the bottom to the top. In a further aspect, the gradient change in resistance across the lens device can provide a gradient in light propagation across the surface area of the lens device 102. As shown in FIG. 10, the gradient in resistivity can be achieved by varying the pattern in which the conductive layer is adhered to the substrate. In a further aspect as shown in FIG. 11, the active dimming layer can be configured such that discrete sections 1102 of the lens 102 can be selectively dimmed in discrete sections on the surface area of the lens device. In yet another aspect, the active dimming layer 106 can be distributed through the entirety of the lens device 102.

In an alternate embodiment, the electric resistance can be adjusted for configurations implementing electrochromic activation layers by orienting a bus bar 1202 at the bottom of the lens device. The bus bar 1202 can also increase the conductivity in proximity to the bus bar 1202. The bus bar 1202 can be used to distribute electricity more evenly throughout the lens device. In particular, the bus bar 1202 can increase contact of the lens device 102 with components with a good conductor, as opposed to simply attaching the device to an electricity source at a single point. In a further aspect, the bus bar 1202 can be highly conductive in comparison to the device's transparent conductor layer 124. Since a very high conductivity reduces interference, positioning the bus bar 1202 near the antenna can reduce interference. The bus bar 1202 can be transparent semitransparent, or opaque. Further, the bus bar 1202 may be fabricated from a transparent or substantially transparent material having electrically conductive properties. For example, the bus bar 1202 may be made from a transparent conducting oxide. The transparent conducting oxide can comprise an electronically conductive agent such as conductive nanowires or other conductive nanostructures.

Figures 13, 14:
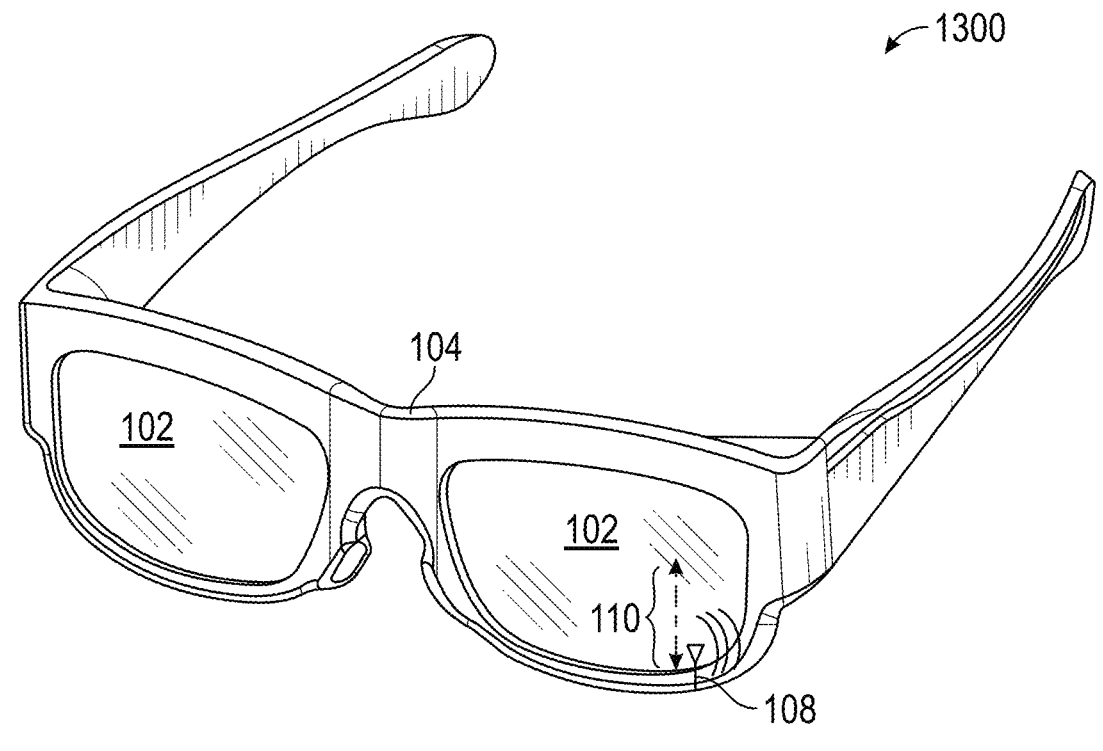
FIG. 13 depicts an isometric view of the system with antenna placement.
FIG. 14 depicts an isometric view of the system with an alternate embodiment of antenna placement.

As previously discussed and depicted in FIG. 2, reducing the degradation of the antenna signal can be achieved by increasing the resistivity in the layers of the lens device 102. Further, the increased resistivity can be set to certain regions of the lens device. The system 100 can also reduce the degradation of the antenna signal by positioning the antenna at locations on the frame 104 that exceed a minimum separation distance 110. In one aspect, the minimum separation distance 110 can be at least 1.2 mm. The placement adjustments to the antenna 108 on the frame can be configured to maintain signal efficiency degradation below 3 decibels (dB). The separation distance 110 can be defined by the distance between the antenna 108 and a region of the active dimming layer 106 that generates resistivity. For an embodiment of the system 1300 as depicted in FIG. 13, when the surface resistance of the active dimming layer 124 comprises a gradient that orients the majority of the surface resistance at the bottom of the lens device 102, minimizing the efficiency degradation can require placing the antenna 108 at the bottom region of the frame 104. In another embodiment of the system 1400, as depicted in FIG. 14, the antenna can be placed in proximity of the hinge of the frame 104. The placement of the antenna 108 in proximity to the hinge/temple 1404 of the frame can insure the minimum separation distance 110 is exceeded.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior present disclosure. Further, the dates of publication provided herein can be different from the actual publication dates, which can require independent confirmation.

The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Insofar as the description above and the accompanying drawing disclose any additional subject matter that is not within the scope of the claims below, the disclosures are not dedicated to the public and the right to file one or more applications to claim such additional disclosures is reserved.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

The following is claimed:

1. An optical system comprising:
a lens device that includes:
  a first lens layer,
  an eye-tracking layer adjacent to the first lens layer,
  a waveguide layer oriented adjacent to the eye-tracking layer,
  an active dimming layer oriented adjacent to the waveguide layer,
  a second lens layer oriented adjacent to the active dimming layer; and
a frame configured to house the lens device, comprising an antenna, wherein the antenna is spatially oriented away from the waveguide layer and active dimming layer by at least a separation distance.

2. The optical system of claim 1, wherein the active dimming layer is encapsulated in the second lens layer.

3. The optical system of claim 1, wherein the first lens layer is defined by a first optical power value.

4. The optical system of claim 3, wherein the first optical power value comprises a prescription optical power associated with a user's optical prescription.

5. The optical system of claim 4, wherein a second optical power value comprises the absolute value of first optical power minus the absolute value of the prescription optical power.

6. The optical system of claim 1, wherein the separation distance is at least 1.2 millimeters.

7. The optical system of claim 1, wherein the active dimming layer is oriented on an outer surface of the second lens layer.

8. The optical system of claim 7, further comprising a cap layer oriented on an exterior surface of the active dimming layer configured to protect the active dimming layer.

9. The optical system of claim 8, wherein the second lens layer comprises a photochromic sublayer.

10. The optical system of claim 9, wherein the second lens layer comprises an anti-reflective coating.

11. An optical system comprising:
a lens device that includes:
  a first lens layer,
  an eye-tracking layer adjacent to the first lens layer,
  a waveguide layer oriented adjacent to the eye-tracking layer,
  an active dimming layer oriented adjacent to the waveguide layer, comprising a surface resistance that is variable across a surface of the active dimming layer,
  a second lens layer oriented adjacent to the active dimming layer; and
a frame configured to house the lens device, comprising an antenna, wherein the antenna is spatially oriented away from the waveguide layer and active dimming layer by at least a separation distance.

12. The optical system of claim 11, wherein the surface resistance can be oriented to dim the lens device in discrete sections on the surface of the active dimming layer.

13. The optical system of claim 11, wherein the lens device further comprises a bus bar, wherein the bus bar is oriented at a bottom interface of the lens device and the frame.

14. The optical system of claim 11, wherein the active dimming layer is configured to variably obstruct light propagation through the active dimming layer.

15. The optical system of claim 14, wherein the active dimming layer comprises a conduction layer wherein a resistance of the conduction layer varies along a length dimension of the lens device.

16. The optical system of claim 11, wherein the active dimming layer comprises a transparent conductor layer and a substrate layer, wherein an interface between the transparent conductor layer and the substrate layer comprises a mated engagement pattern.

17. The optical system of claim 11, wherein the first lens layer is defined by a first optical power value.

18. The optical system of claim 17, wherein the first optical power value comprises a prescription optical power associated with a user's optical prescription.

19. The optical system of claim 17, wherein the first optical power value and a second optical power value associated with the second lens layer equates to zero.

20. The optical system of claim 11, wherein the separation distance is at least 1.2 millimeters.

* * * * *